United States Patent
Tsai et al.

(10) Patent No.: US 8,422,742 B2
(45) Date of Patent: Apr. 16, 2013

(54) IMAGE PROCESSING METHOD

(75) Inventors: Tsung-Han Tsai, Zhongli (TW);
Hong-Guang Chen, Taipei (TW);
Hsueh-Yi Lin, Jhongli (TW);
Chen-Yung Hsiao, Taipei (TW)

(73) Assignee: National Central University, Jhongli, Taoyuan County (TW)

( * ) Notice: Subject to any disclaimer, the term of this patent is extended or adjusted under 35 U.S.C. 154(b) by 188 days.

(21) Appl. No.: 13/170,530

(22) Filed: Jun. 28, 2011

(65) Prior Publication Data
US 2012/0039512 A1    Feb. 16, 2012

(30) Foreign Application Priority Data
Aug. 13, 2010 (TW) .............................. 99127189 A

(51) Int. Cl.
*G06K 9/00* (2006.01)
*H04N 5/14* (2006.01)
*H04N 1/40* (2006.01)

(52) U.S. Cl.
USPC .............................. 382/107; 348/571; 358/448

(58) Field of Classification Search .................. 382/103, 382/107, 162, 235, 236, 276, 307; 348/154, 348/155, 208.1, 208.2, 208.16, 211.1, 222.1, 348/352, 407.1, 451, 452, 571; 358/3.23, 358/448, 530
See application file for complete search history.

(56) References Cited

U.S. PATENT DOCUMENTS
7,526,028 B2 * 4/2009 Sung et al. ............... 375/240.16

FOREIGN PATENT DOCUMENTS
TW  480885     3/2002
TW  201002080  1/2010

OTHER PUBLICATIONS

English translation of abstract of TW 480885.
English translation of abstract of TW 201002080.

* cited by examiner

*Primary Examiner* — Abolfazl Tabatabai
(74) *Attorney, Agent, or Firm* — McClure, Qualey & Rodack, LLP

(57) ABSTRACT

An image processing method comprises obtaining a current frame and a previous frame, performing a bilateral motion estimation to the current frame and the previous frame for acquiring a motion vector, and performing a motion compensated interpolation to the current frame, the previous frame and the motion vector for acquiring an interpolated frame. The bilateral motion estimation uses sum of bilateral absolute difference algorithm to generate at least one sum of bilateral absolute difference, and then an adaptive parameter is added to each of the sum of bilateral absolute difference to generate at least one adaptive sum of bilateral absolute difference. A group of matching blocks having a minimum adaptive sum of bilateral absolute difference is then determined to be the group of best matching blocks. The motion vector is obtained according to the relative locations of the best matching blocks.

13 Claims, 6 Drawing Sheets

IMAGE PROCESSING METHOD

RELATED APPLICATIONS

This application claims priority to Taiwan Application Serial Number 099127189, filed Aug. 13, 2010, which is herein incorporated by reference.

BACKGROUND

1. Field of Invention

The embodiment of the present invention relates generally to a method of image processing and, more particularly, to a method of image processing using bilateral motion estimation.

2. Description of Related Art

The property of the liquid crystal display is light and small, and the liquid crystal display has low power consumption and no irradiation so that nowadays the liquid crystal display has taken the place of the conventional picture tube display gradually. The liquid crystal display is a hold-type display, and the liquid crystal display keeps the original brightness until the next time the frame renews itself; that is to say, the liquid crystal display keeps its original frame for a period of time.

Due to the vision persistence of human eyes, the longer the display keeps the original frame, the longer the image will stay on the retina. Furthermore, when people watch an object, the human eyes will follow the motion of the object so as to watch the object clearly no matter the object moves in a liner way or a non-liner way. Because of the characteristic of human eyes, the image of the previous frame and the current frame will overlap to each other after the frame renews itself owing to the vision persistence so that we will feel that the edge of the moving object is blurred, and that is the reason the motion blur occurs.

The so-called blurring effect of the liquid crystal display is caused by the property of keeping the original frame in the liquid crystal display and the vision persistence of human eyes, and the adjacent image frames will overlap to each other. For example, the object of the previous frame and the object of the current frame overlap to each other when the frame renews itself due to the vision persistence, which leads to the blurring effect of the object and make the user feel uncomfortable to watch the object.

In view of the foregoing, how to reduce the time of keeping the frame in the liquid crystal display for solving the blurring effect of the liquid crystal display is a problem for the industry to find a solution.

SUMMARY

A method of image processing is provided so as to solve the blurring effect of the liquid crystal display.

Thus, one aspect of the embodiment of the present invention is to provide a method of image processing. The method comprises the steps of acquiring a current frame and a previous frame; performing a bilateral motion estimation to the current frame and the previous frame for acquiring a motion vector; and performing a motion compensation to the current frame, the previous frame, and the motion vector for acquiring an interpolated frame.

In addition, the step of performing the bilateral motion estimation further comprises the steps of generating at least one adaptive sum of bilateral absolute difference, wherein the bilateral motion estimation uses a sum of bilateral absolute difference algorithm to generate at least one sum of bilateral absolute difference, and an adaptive parameter is added to each sum of bilateral absolute difference for generating the adaptive sum of bilateral absolute difference; and determining one group of best matching blocks by determining the adaptive sum with the smallest value in at least one group of matching blocks from the current frame and the previous frame, and the group of best matching blocks are the group of matching blocks with the smallest adaptive sum value; and acquiring the motion vector according to a relative position of the group of the best matching blocks.

In one embodiment of the present invention, the step of performing the bilateral motion estimation further comprises: using the interpolated frame as a basis to acquire the group of matching blocks from the current frame and the previous frame symmetrically.

In another embodiment of the present invention, before the step of performing the motion compensation to the current frame, the previous frame, and the motion vector further comprises: performing a motion vector smoothing process to the motion vector.

In yet another embodiment of the present invention, the adaptive sum of bilateral absolute differences is generated by the following formula:

$$ASBAD = \sum_{i=0}^{N-1}\sum_{j=0}^{M-1}(|f_n(x-h+i, y-k+j) - f_{n-1}(x+h+i, y+k+j)| + a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter.

In another aspect, the embodiment of the present invention provides a method of image processing. The method comprises the steps of acquiring a current frame and a previous frame; performing a sub-sampled motion estimation to the current frame and the previous frame to generate a motion vector; and performing a motion compensation to the current frame, the previous frame, and the motion vector for acquiring an interpolated frame.

In addition, the step of performing the sub-sampled motion estimation further comprises the steps of: generating a plurality of adaptive sums of bilateral absolute difference, wherein the sub-sampled motion estimation uses a sum of bilateral absolute difference algorithm to generate a plurality of sums of bilateral absolute difference, and an adaptive parameter is added to each of the sums of bilateral absolute difference for generating the adaptive sums of bilateral absolute difference; determining a best matching block by determining the adaptive sum with the smallest value in the matching blocks from the current frame and the previous frame, and the best matching block is the matching block with the smallest adaptive sum value; and acquiring the motion vector according to a relative position of a current frame block and the best matching block.

In one embodiment of the present invention, the step of performing the sub-sampled motion estimation further comprises: acquiring the matching block every other pixel.

In another embodiment of the present invention, before the step of performing the motion compensation to the current frame, the previous frame, and the motion vector further comprises: performing a motion vector smoothing process to the motion vector.

In yet another embodiment of the present invention, the adaptive sums of bilateral absolute differences are generated by the following formula:

$$ASBAD = \sum_{i=0}^{N-1}\sum_{j=0}^{M-1}(|f_n(x-h+i, y-k+j) - f_{n-1}(x+h+i, y+k+j)| + a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter.

In yet another aspect, the embodiment of the present invention provides a method of image processing. The method comprises the steps of: acquiring a current frame and a previous frame; performing an extended bilateral motion estimation and a sub-sampled motion estimation to the current frame and the previous frame to generate a first motion vector and a second motion vector respectively; determining a best motion vector by comparing the first sums and the second sums to determine the sum with the smallest value, and the best motion vector is the first or second motion vector corresponding to the sum with the smallest value; and performing a motion compensation to the current frame, the previous frame, and the motion vector for acquiring an interpolated frame.

In addition, the step of performing the extended bilateral motion estimation and the sub-sampled motion estimation step further comprises the steps of: generating a plurality of first adaptive sums of bilateral absolute difference and a plurality of second adaptive sums of bilateral absolute difference, wherein the extended bilateral motion estimation and the sub-sampled motion estimation use a sum of bilateral absolute difference algorithm to generate a plurality of sums of bilateral absolute difference, and an adaptive parameter is added to each of the sums of bilateral absolute difference to generate the first adaptive sums and the second adaptive sums respectively; determining the first adaptive sum with the smallest value and the second adaptive sum with the smallest value according to a plurality of matching blocks acquired from the current frame and the previous frame using the extended bilateral motion estimation and the sub-sampled motion estimation, wherein the first best matching block is the matching block with the smallest first adaptive sum value, and the second best matching block is the matching block with the smallest second adaptive sum value; and acquiring the first motion vector according to a relative position of the first best matching block, and acquiring the second motion vector according to a relative position of the second best matching block.

In one embodiment of the present invention, the step of performing the sub-sampled motion estimation further comprises: acquiring the matching block every other pixel.

In another embodiment of the present invention, the step of performing the extended bilateral motion estimation further comprises the steps of: separating a searching block of the interpolated frame into a plurality of blocks; generating a plurality of reference blocks between adjacent ones of the blocks; and using the blocks and the reference blocks as a basis to acquire at least one group of matching blocks from the current frame and the previous frame symmetrically.

In yet another embodiment of the present invention, before the step of performing a motion compensation to the current frame, the previous frame, and the best motion vector further comprises: performing a motion vector smoothing process to the best motion vector.

In still another embodiment of the present invention, the first adaptive sums and the second adaptive sums are generated by the following formula:

$$ASBAD = \sum_{i=0}^{N-1}\sum_{j=0}^{M-1}(|f_n(x-h+i, y-k+j) - f_{n-1}(x+h+i, y+k+j)| + a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter.

As a result, the embodiment of the present invention provides a method of image processing for acquiring the interpolated frame, and the interpolated frame is inserted between the previous frame and a current frame so as to increase the frame rate and decrease the hold time of the liquid crystal display frame so that the blurring effect of the liquid crystal display can be solved. In addition, one embodiment of the present invention uses the adaptive sum of bilateral absolute difference algorithm so as to increase the accuracy of the interpolated frame.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
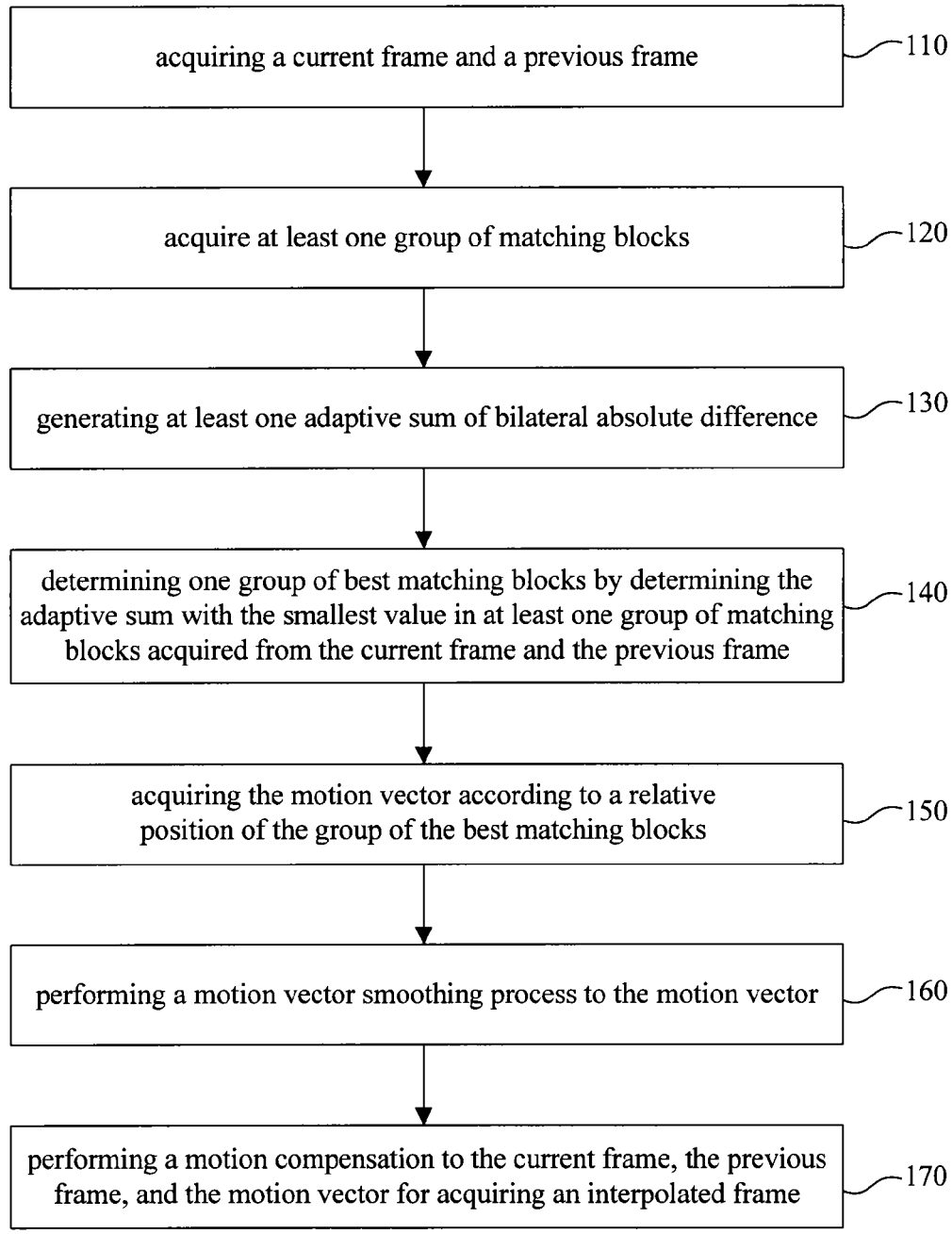
FIG. 1 shows schematically a flow diagram of a method of image processing according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

FIG. 1 shows schematically a flow diagram of a method of image processing according to one embodiment of the present invention. In one embodiment of the present invention, the method includes the steps of acquiring a current frame and a previous frame (step 110); assuming that there is an interpolated frame, then using the interpolated frame as a basis to acquire at least one group of matching blocks from the current frame and the previous frame symmetrically (step 120); performing a bilateral motion estimation to the group of matching blocks for generating at least one adaptive sum of bilateral absolute difference (step 130), wherein the bilateral motion estimation uses a sum of bilateral absolute difference algorithm to generate at least one sum of bilateral absolute difference, and an adaptive parameter is added to each sum of bilateral absolute difference for generating at least one adaptive sum of bilateral absolute difference. In addition, the bilateral motion estimation can be performed by a bilateral motion estimation module.

Next, the method further includes the steps of determining one group of best matching blocks by determining the adaptive sum with the smallest value in at least one group of matching blocks (step 140), acquiring the motion vector according to a relative position of the group of the best matching blocks (step 150); performing a motion vector smoothing process to the motion vector (step 160); performing a motion compensation to the current frame, the previous frame, and the motion vector for acquiring an interpolated frame (step 170). In addition, the motion vector smoothing process step can be performed by a motion vector smoothing process module, and the motion compensation can be performed by a motion compensation module.

In order to acquire a motion vector of the moving object in a frame, a bilateral motion estimation can be used, and the algorithm we use regularly is a sum of bilateral absolute difference algorithm. When a group of matching blocks with the smallest sum is found in a searching range, this represents that the pixel value of the image in two matching blocks of the group of matching blocks is close to each other; that is to say, the image in two matching blocks is the most similar. However, when there is background with similar patterns or similar patterns in the searching range, the bilateral motion estimation will fail so that the above mention leads to a distortion of the interpolated frame. As a result, the embodiment of the present invention provides an adaptive bilateral motion estimation to solve the shortcoming of the bilateral motion estimation.

Figure 2:
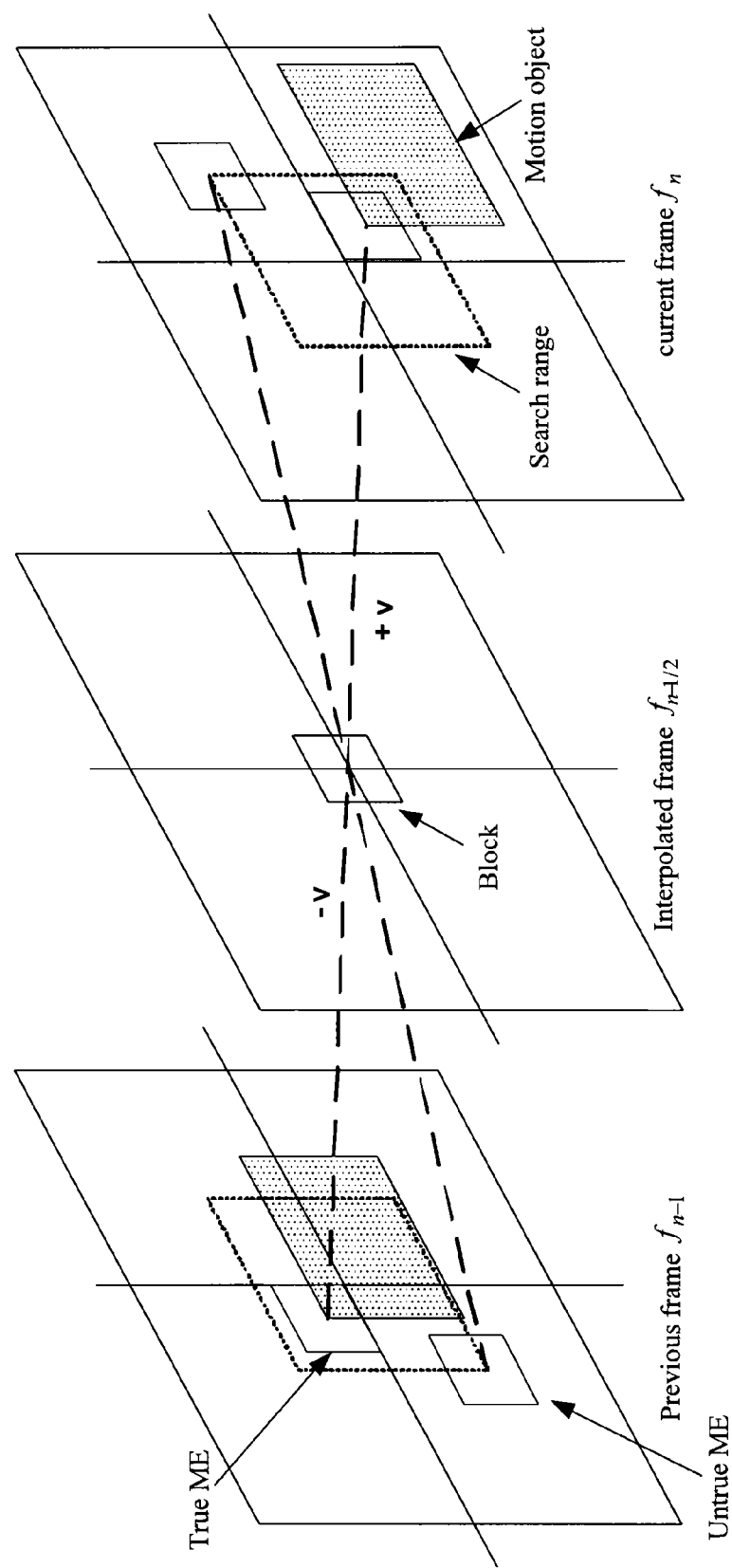
FIG. 2 shows schematically a diagram of bilateral motion estimation according to one embodiment of the present invention.

Reference is now made to FIG. 2 which shows schematically a diagram of bilateral motion estimation according to one embodiment of the present invention. The wrong matching block the bilateral motion estimation chooses is usually in the periphery portion of the searching range, and the matching block corresponding to the real object is usually in the middle portion of the searching range. We assume that the matching block away from the middle of the searching range may be the similar object in the background or the frame not the real object when using the adaptive bilateral motion estimation. Consequently, when there are two matching blocks with the smallest sum wherein one matching block is in the periphery portion of the searching range and the other is in the middle portion of the searching range, the matching block in the middle portion will be chose as the best matching block by the adaptive bilateral motion estimation.

Reference is now made to FIG. 1, in step 130, the adaptive sum of bilateral absolute difference is generated by the following formula:

$$ASBAD = \sum_{i=0}^{N-1} \sum_{j=0}^{M-1} (|f_n(x-h+i, y-k+j) - f_{n-1}(x+h+i, y+k+j)| + a(h, k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter. Comparing with the sum of bilateral absolute difference algorithm, an adaptive parameter is further added to the adaptive bilateral absolute difference algorithm, and the adaptive parameter is the assumed motion vector.

When there are at least two matching blocks in the searching range (for example, as shown in FIG. 2, the real matching block generated by the correct motion estimation and the wrong matching block generated by the incorrect motion estimation) and both of them have the smallest sum, the motion vector the matching block away from the middle portion of the searching range has will let the adaptive parameter become larger and the motion vector the matching block close to the middle portion of the searching range has will let the adaptive parameter become smaller. As a result, the matching block close to the middle portion of the searching range has the smallest adaptive sum of bilateral absolute difference so that the matching block will be chose to be the best matching block as the determining step in step 140.

In step 140, the group of matching blocks acquired in step 120 will be calculated through step 130, and then the best matching block will be determined by determining the matching block with the smallest adaptive sum so that the matching block with the smallest adaptive sum is the group of best matching block. After that, in step 150, the motion vector can be acquired according to the relative position of the group of the best matching blocks.

In step 160, the motion vector smoothing process can be performed owing to assuming that the adjacent motion vectors have identical directionality when the object moves. As a result, the motion vector smoothing process includes the steps of detecting an outlier, and rectifying the motion vector of the outlier so that the motion vector of the outlier and the adjacent motion vector will have identical directionality.

In step 170, the motion compensation can be performed owing to assuming that the motion traces of the objects are linear and the objects move along rectilinear direction between the adjacent frames of the film in an extremely short time period. As a result, the interpolated frame will be separated into several blocks with the same size when compensated, and the motion vector will be used as a basis to insert the frame.

Figure 3:
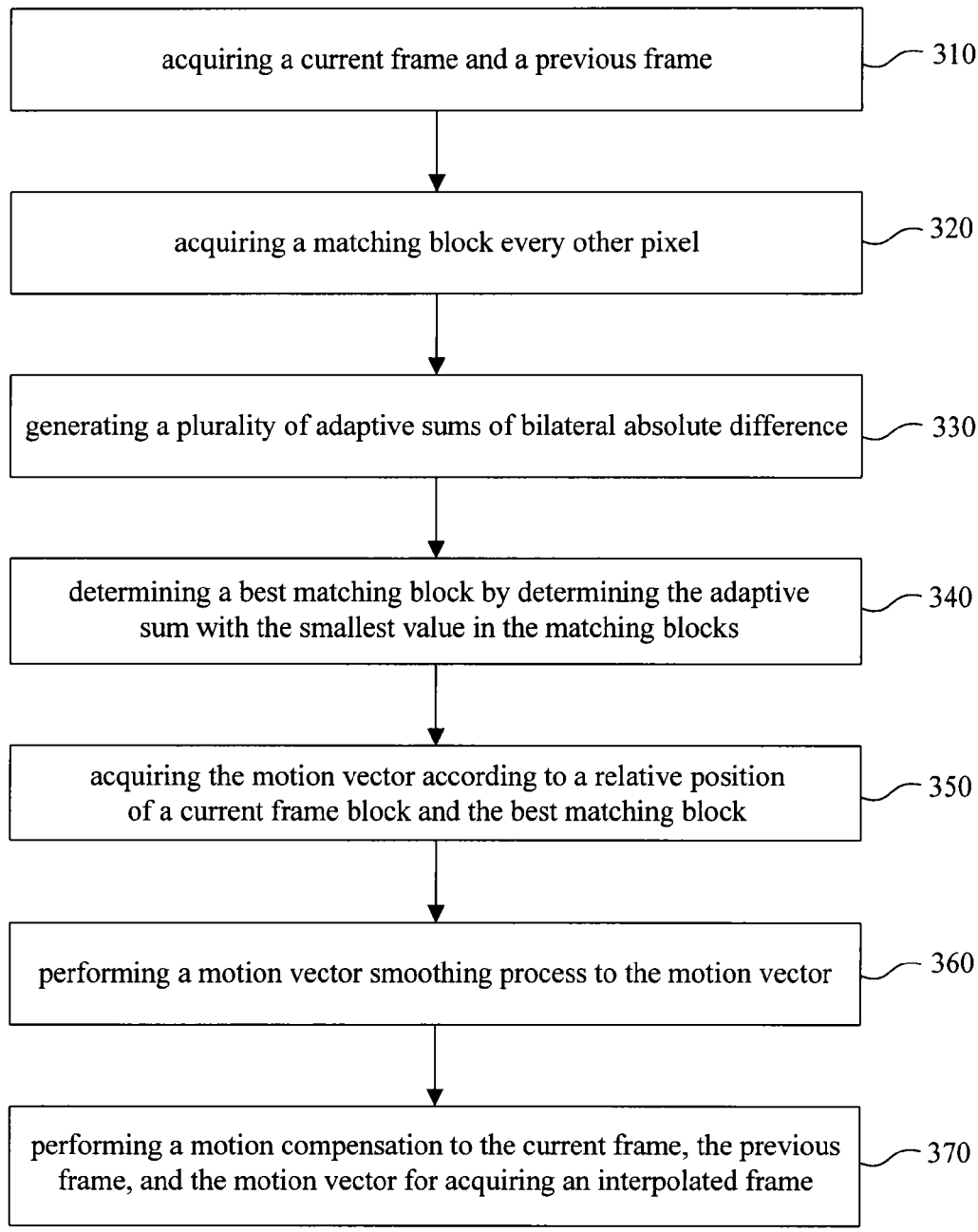
FIG. 3 shows schematically a flow diagram of a method of image processing according to another embodiment of the present invention.

FIG. 3 shows schematically a flow diagram of a method of image processing according to another embodiment of the present invention. In one embodiment of the present invention, the method includes the steps of acquiring a current frame and a previous frame (step 310); acquiring a block in the searching range of the current frame, and acquiring a matching block every other pixel in the searching range of the previous frame (step 320); performing a sub-sampled motion estimation to the block and matching block for generating a plurality of adaptive sums of bilateral absolute difference (step 330), wherein the sub-sampled motion estimation uses a sum of bilateral absolute difference algorithm to generate a plurality of sums of bilateral absolute difference, and an adaptive parameter is added to each sum of bilateral absolute difference for generating the adaptive sums of bilateral absolute difference. In addition, the sub-sampled motion estimation step can be performed by a sub-sampled motion estimation module.

Next, the method further includes the steps of determining a best matching block by determining the adaptive sum with the smallest value in the matching blocks from the current frame and the previous frame, and the best matching block is the matching block with the smallest adaptive sum value (step 340); acquiring the motion vector according to a relative position of a current frame block and the best matching block (step 350); performing a motion vector smoothing process to the motion vector (step 360); performing a motion compensation to the current frame, the previous frame, and the motion vector for acquiring an interpolated frame (step 370). In addition, the motion vector smoothing process step can be performed by a motion vector smoothing process module, the motion compensation can be performed by a motion compensation module.

In order to acquire a motion vector of the moving object in the frame, the algorithm we use regularly is a sum of bilateral absolute difference algorithm. When the matching block with the smallest sum is found in a searching range of the previous frame, this represents that the pixel value of an image in the matching block of the previous frame is close to the pixel value of an image in the block of the current frame; that is to say, the images of both are similar to each other. However, when there is background with similar patterns or similar patterns in the searching range, the bilateral motion estimation will fail so that the above mention leads to a distortion of the interpolated frame.

As a result, the embodiment of the present invention provides an adaptive sum of bilateral absolute difference algorithm to solve the shortcoming of the sum of bilateral absolute difference algorithm. The wrong matching block the sum of bilateral absolute difference chooses is usually in the periphery portion of the searching range, and the matching block corresponding to the real object is usually in the middle portion of the searching range. We assume that the matching block away from the middle of the searching range may be the similar object in the background or the frame not the real object when using the adaptive sum of bilateral absolute difference. Consequently, when there are two matching blocks with the smallest sum wherein one matching block is in the periphery portion of the searching range and the other is in the middle portion of the searching range, the matching block in the middle portion will be chose as the best matching block by the adaptive sum of bilateral absolute difference.

Figure 4:
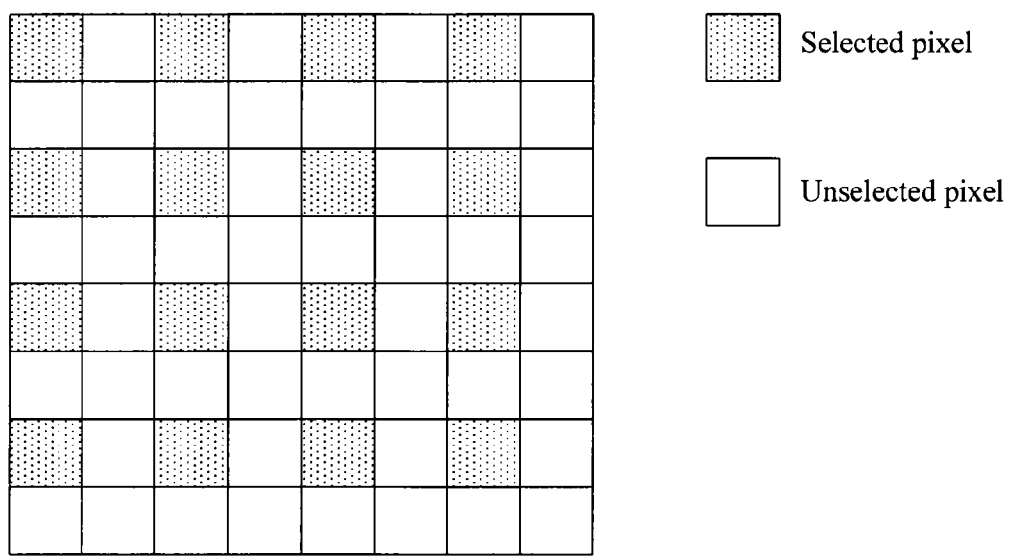
FIG. 4 shows schematically a diagram of sub-sampled motion estimation according to another embodiment of the present invention.

The sub-sampled motion estimation uses the adaptive sum of bilateral absolute difference is shown in step 320 to step 350. In step 320, reference is now made to FIG. 4 which shows schematically a diagram of sub-sampled motion estimation according to another embodiment of the present invention, the matching block will be acquired every other pixel in the searching range of the previous frame so as to reduce the searching area of the matching block and decrease the computation. In view of the foregoing, the computation we save can be used to increase the searching range. As a result, the motion estimation can be performed accurately in the film where the object moves with a high speed.

As shown in FIG. 3, in step 330, the adaptive sums of bilateral absolute difference are generated by the following formula:

$$ASBAD = \sum_{i=0}^{N-1}\sum_{j=0}^{M-1}(|f_n(x-h+i, y-k+j) - f_{n-1}(x+h+i, y+k+j)| + a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter. Comparing with the sum of bilateral absolute difference algorithm, an adaptive parameter is further added to the adaptive bilateral absolute difference algorithm, and the adaptive parameter is the assumed motion vector.

When there are at least two matching blocks in the searching range of the previous frame (for example, as shown in FIG. 2, the real matching block generated by the correct motion estimation and the wrong matching block generated by the incorrect motion estimation) and both of them have the smallest sum, the motion vector the matching block away from the middle portion of the searching range has will let the adaptive parameter become larger and the motion vector the matching block close to the middle portion of the searching range has will let the adaptive parameter become smaller. As a result, the matching block close to the middle portion of the searching range has the smallest adaptive sum of bilateral absolute difference so that the matching block will be chose to be the best matching block as the determining step in step 240.

In step 340, the matching block acquired in step 320 will be calculated through step 330, and then the best matching block will be determined by determining the matching block with the smallest adaptive sum so that the matching block with the smallest adaptive sum is the best matching block. After that, in step 350, the motion vector can be acquired according to the relative position of the current frame block and the best matching block.

In step 360, the motion vector smoothing process can be performed owing to assuming that the adjacent motion vectors have identical directionality when the object moves. As a result, the steps of the motion vector smoothing process includes detecting an outlier, and rectifying the motion vector of the outlier so that the motion vector of the outlier and the adjacent motion vector will have identical directionality.

In step 370, the motion compensation can be performed owing to assuming that the motion traces of the objects are linear and the objects move along rectilinear direction between the adjacent frames of the film in an extremely short time period. As a result, the interpolated frame will be separated into several blocks with the same size when compensated, and the motion vector will be used as a basis to insert the frame.

Figure 5:
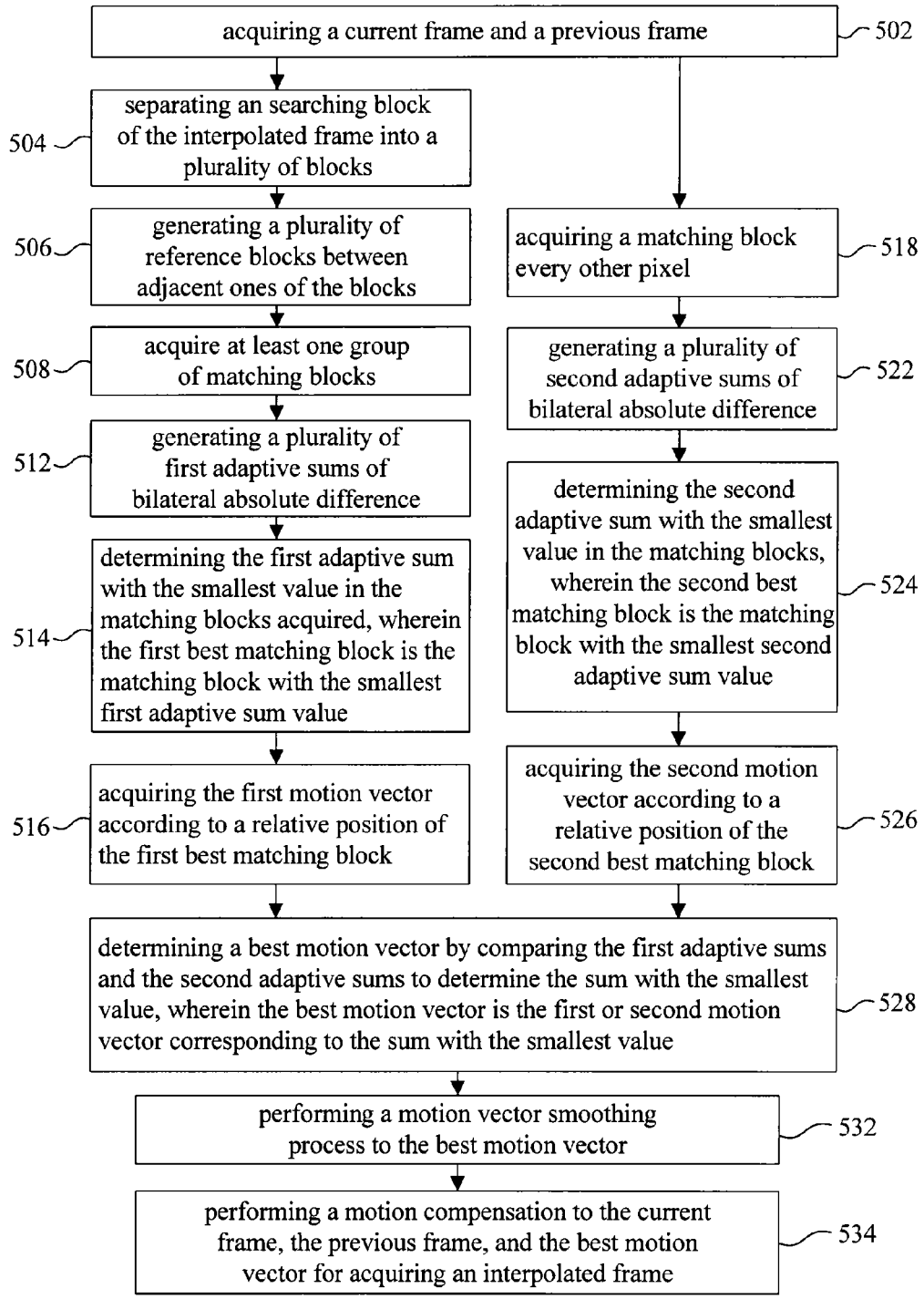
FIG. 5 shows schematically a flow diagram of a method of image processing according to yet another embodiment of the present invention.

FIG. 5 shows schematically a flow diagram of a method of image processing according to yet another embodiment of the present invention. In one embodiment of the present invention, the method includes the steps of acquiring a current frame and a previous frame (step 502); separating a searching block of the interpolated frame into a plurality of blocks (step 504); generating a plurality of reference blocks between adjacent ones of the blocks (step 506); using the blocks and the reference blocks as bases to acquire at least one group of matching blocks from the current frame and the previous frame symmetrically (step 508); performing an extended bilateral motion estimation to the group of matching blocks for generating a plurality of first adaptive sums of bilateral absolute difference (step 512), wherein the extended bilateral motion estimation using a sum of bilateral absolute difference algorithm to generate a plurality of sums of bilateral absolute difference, and an adaptive parameter is added to each of the sums to generate the first adaptive sums; determining the first adaptive sum with the smallest value according to the matching blocks acquired from the current frame and the previous frame using the extended bilateral motion estimation, wherein the first best matching block is the matching block with the smallest first adaptive sum value (step 514); acquiring the first motion vector according to a relative position of the first best matching block (step 516). In addition, the extended bilateral motion estimation step can be performed by an extended bilateral motion estimation module.

Furthermore, the method according to one embodiment of the present invention includes the steps of acquiring a current frame and a previous frame (step 502); acquiring a block in the searching range of the current frame, and acquiring a matching block every other pixel in the searching range of the previous frame (step 518); performing a sub-sampled motion estimation to the block and the matching block for generating a plurality of second adaptive sums of bilateral absolute difference (step 522), wherein the sub-sampled motion estimation uses a sum of bilateral absolute difference algorithm to generate a plurality of sums of bilateral absolute difference, and an adaptive parameter is added to each of the sums of bilateral absolute difference for generating the second adaptive sums of bilateral absolute difference; determining the second adaptive sum with the smallest value according to the matching blocks acquired from the previous frame using the sub-sampled motion estimation, wherein the second best matching block is the matching block with the smallest second adaptive sum value (step 524); and acquiring the second motion vector according to a relative position of the second best matching block (step 526). In addition, the sub-sampled motion estimation step can be performed by a sub-sampled motion estimation module.

In addition, the method further includes the steps of determining a best motion vector by comparing the first adaptive sums and the second adaptive sums to determine the sum with the smallest value, wherein the best motion vector is the first or second motion vector corresponding to the sum with the smallest value (step 528); performing a motion vector smoothing process to the best motion vector (step 532); performing a motion compensation to the current frame, the previous frame, and the best motion vector for acquiring an interpolated frame (step 534). In addition, the motion vector smoothing process step can be performed by a motion vector smoothing process module, and the motion compensation can be performed by a motion compensation module.

In order to acquire a motion vector of the moving object in the frame, the algorithm we use regularly is a sum of bilateral absolute difference algorithm. When the matching block with the smallest sum is found in a searching range of the previous frame, this represents that the pixel value of an image in the matching block of the previous frame is close to the pixel value of an image in the block of the current frame; that is to say, the images of both are similar to each other. However, when there is background with similar patterns or similar patterns in the searching range, the bilateral motion estimation will fail so that the above mention leads to a distortion of the interpolated frame.

As a result, the embodiment of the present invention provides an adaptive sum of bilateral absolute difference algorithm to solve the shortcoming of the sum of bilateral absolute difference algorithm. The wrong matching block the sum of bilateral absolute difference chooses is usually in the periphery portion of the searching range, and the matching block corresponding to the real object is usually in the middle portion of the searching range. We assume that the matching block away from the middle of the searching range may be the similar object in the background or the frame not the real object when using the adaptive sum of bilateral absolute difference. Consequently, when there are two matching blocks with the smallest sum wherein one matching block is in the periphery portion of the searching range and the other is in the middle portion of the searching range, the matching block in the middle portion will be chose as the best matching block by the adaptive sum of bilateral absolute difference.

Figure 6:
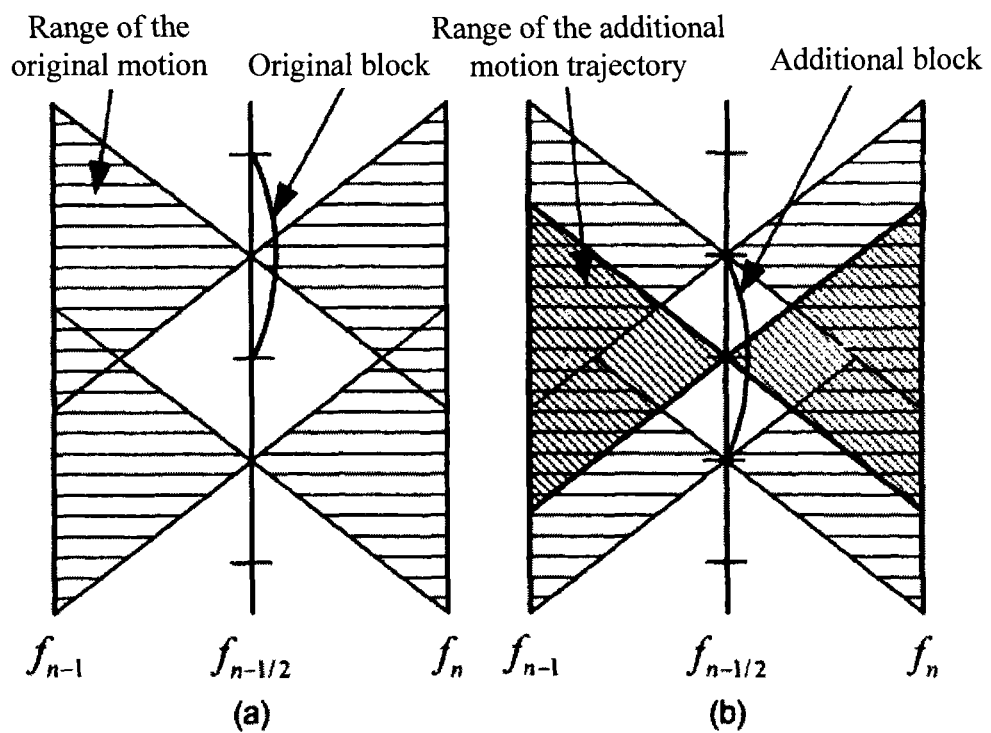
FIG. 6 shows schematically a diagram of extended bilateral motion estimation according to yet another embodiment of the present invention.

The extended bilateral motion estimation using the adaptive sum of bilateral absolute difference is shown in step 504 to step 516. In step 506, reference is now made to FIG. 6 which shows schematically a diagram of extended bilateral motion estimation according to yet another embodiment of the present invention, each of the reference blocks is generated between adjacent ones of the blocks. In step 508, the blocks and the reference blocks will be used as bases to acquire the group of matching blocks from the current frame and the previous frame symmetrically. As a result, comparing with the bilateral motion estimation, the reference blocks are further added to the extended bilateral motion estimation so that the area of the motion estimation is increased to improve the accuracy of the motion estimation.

Reference is now made to FIG. 5, in step 512, the first adaptive sums of bilateral absolute difference are generated by the following formula:

$$ASBAD =$$

-continued $$\sum_{i=0}^{N-1}\sum_{j=0}^{M-1}(|f_n(x-h+i,y-k+j)-f_{n-1}(x+h+i,y+k+j)|+a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter. Comparing with the sum of bilateral absolute difference algorithm, an adaptive parameter is further added to the adaptive bilateral absolute difference algorithm, and the adaptive parameter is the assumed motion vector.

When there are at least two matching blocks in the searching range (for example, as shown in FIG. 2, the real matching block generated by the correct motion estimation and the wrong matching block generated by the incorrect motion estimation) and both of them have the smallest sum, the motion vector the matching block away from the middle portion of the searching range has will let the adaptive parameter become larger and the motion vector the matching block close to the middle portion of the searching range has will let the adaptive parameter become smaller. As a result, the matching block close to the middle portion of the searching range has the smallest adaptive sum of bilateral absolute difference so that the matching block will be chose to be the best matching block as the determining step in step 514.

In step 514, the matching blocks acquired in step 508 will be calculated through step 512, and then the group of first best matching block will be determined by determining the matching block with the smallest adaptive sum so that the matching block with the smallest adaptive sum is the group of first best matching block. After that, in step 516, the first motion vector can be acquired according to the relative position of the group of first best matching blocks.

The sub-sampled motion estimation uses the adaptive sum of bilateral absolute difference is shown in step 518 to step 526. In step 518, reference is now made to FIG. 4, the matching block will be acquired every other pixel in the searching range of the previous frame so as to reduce the searching area of the matching block and decrease the computation. In view of the foregoing, the computation we save can be used to increase the searching range. As a result, the motion estimation can be performed accurately in the film where the object moves with a high speed.

In step 522, the second adaptive sums of bilateral absolute difference are generated by the following formula:

$$ASBAD = \sum_{i=0}^{N-1}\sum_{j=0}^{M-1}(|f_n(x-h+i,y-k+j)-f_{n-1}(x+h+i,y+k+j)|+a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter. Comparing with the sum of bilateral absolute difference algorithm, an adaptive parameter is further added to the adaptive bilateral absolute difference algorithm, and the adaptive parameter is the assumed motion vector.

When there are at least two matching blocks in the searching range of the previous frame (for example, as shown in FIG. 2, the real matching block generated by the correct motion estimation and the wrong matching block generated by the incorrect motion estimation) and both of them have the smallest sum, the motion vector the matching block away from the middle portion of the searching range has will let the adaptive parameter become larger and the motion vector the matching block close to the middle portion of the searching range has will let the adaptive parameter become smaller. As a result, the matching block close to the middle portion of the searching range has the smallest adaptive sum of bilateral absolute difference so that the matching block will be chose to be the best matching block as the determining step in step 524.

In step 524, the matching block acquired in step 518 will be calculated through step 522, and then the second best matching block will be determined by determining the matching block with the smallest adaptive sum so that the matching block with the smallest adaptive sum is the second best matching block. After that, in step 526, the second motion vector can be acquired according to the relative position of the current frame block and the second best matching block.

In step 532, the motion vector smoothing process can be performed owing to assuming that the adjacent motion vectors have identical directionality when the object moves. As a result, the steps of the motion vector smoothing process includes detecting an outlier, and rectifying the motion vector of the outlier so that the motion vector of the outlier and the adjacent motion vector will have identical directionality.

In step 534, the motion compensation can be performed owing to assuming that the motion traces of the objects are linear and the objects move along rectilinear direction between the adjacent frames of the film in an extremely short time period. As a result, the interpolated frame will be separated into several blocks with the same size when compensated, and the motion vector will be used as a basis to insert the frame.

According to the above embodiments of the present invention, the application of the present invention has the following advantages. The embodiment of the present invention acquires the interpolated frame by the method of image processing, and the interpolated frame will be inserted between the previous frame and the current frame so as to increase the frame rate and decrease the hold time of the liquid crystal display frame so that the blurring effect of the liquid crystal display can be solved. In addition, one embodiment of the present invention uses the adaptive sum of bilateral absolute difference algorithm so as to increase the accuracy of the interpolated frame.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:
1. A method of image processing, comprising:
   acquiring a current frame and a previous frame;

performing a bilateral motion estimation to the current frame and the previous frame for acquiring a motion vector, wherein the step of performing the bilateral motion estimation further comprises:

generating at least one adaptive sum of bilateral absolute difference, wherein the bilateral motion estimation uses a sum of bilateral absolute difference algorithm to generate at least one sum of bilateral absolute difference, and an adaptive parameter is added to each sum of bilateral absolute difference for generating the adaptive sum of bilateral absolute difference;

determining one group of best matching blocks by determining the adaptive sum with the smallest value in at least one group of matching blocks from the current frame and the previous frame, and the group of best matching blocks are the group of matching blocks with the smallest adaptive sum value;

acquiring the motion vector according to a relative position of the group of the best matching blocks; and performing a motion compensation to the current frame, the previous frame, and the motion vector for acquiring an interpolated frame.

2. The method according to claim 1, wherein the step of performing the bilateral motion estimation further comprises:

using the interpolated frame as a basis to acquire the group of matching blocks from the current frame and the previous frame symmetrically.

3. The method according to claim 1, wherein before the step of performing the motion compensation to the current frame, the previous frame, and the motion vector further comprises:

performing a motion vector smoothing process to the motion vector.

4. The method according to claim 1, wherein the adaptive sum of bilateral absolute differences is generated by the following formula:

$$ASBAD = \sum_{i=0}^{N-1}\sum_{j=0}^{M-1}(|f_n(x-h+i, y-k+j) - f_{n-1}(x+h+i, y+k+j)| + a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter.

5. A method of image processing, comprising:

acquiring a current frame and a previous frame;

performing a sub-sampled motion estimation to the current frame and the previous frame to generate a motion vector, wherein the step of performing the sub-sampled motion estimation further comprises:

generating a plurality of adaptive sums of bilateral absolute difference, wherein the sub-sampled motion estimation uses a sum of bilateral absolute difference algorithm to generate a plurality of sums of bilateral absolute difference, and an adaptive parameter is added to each sum of bilateral absolute difference for generating the adaptive sums of bilateral absolute difference;

determining a best matching block by determining the adaptive sum with the smallest value in the matching blocks from the current frame and the previous frame, and the best matching block is the matching block with the smallest adaptive sum value; and acquiring the motion vector according to a relative position of a current frame block and the best matching block; and performing a motion compensation to the current frame, the previous frame, and the motion vector for acquiring a interpolated frame.

6. The method according to claim 5, wherein before the step of performing the motion compensation to the current frame, the previous frame, and the motion vector further comprises:

performing a motion vector smoothing process to the motion vector.

7. The method according to claim 5, wherein the adaptive sum of bilateral absolute differences is generated by the following formula:

$$ASBAD = \sum_{i=0}^{N-1}\sum_{j=0}^{M-1}(|f_n(x-h+i, y-k+j) - f_{n-1}(x+h+i, y+k+j)| + a(h,k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter.

8. The method according to claim 5, wherein the step of performing the sub-sampled motion estimation further comprises:

acquiring the matching block every other pixel.

9. A method of image processing, comprising:

acquiring a current frame and a previous frame;

performing an extended bilateral motion estimation and a sub-sampled motion estimation to the current frame and the previous frame to generate a first motion vector and a second motion vector respectively, wherein the step of performing the extended bilateral motion estimation and the sub-sampled motion estimation step further comprises:

generating a plurality of first adaptive sums of bilateral absolute difference and a plurality of second adaptive sums of bilateral absolute difference, wherein the extended bilateral motion estimation and the sub-sampled motion estimation use a sum of bilateral absolute difference algorithm to generate a plurality of sums of bilateral absolute difference, and an adaptive parameter is added to each of the sums to generate the first adaptive sums and the second adaptive sums respectively;

determining the first adaptive sum with the smallest value and the second adaptive sum with the smallest value according to a plurality of matching blocks acquired from the current frame and the previous frame using the extended bilateral motion estimation and the sub-sampled motion estimation, wherein the first best matching block is the matching block with the smallest first adaptive sum value, and the second best matching block is the matching block with the smallest second adaptive sum value;

acquiring the first motion vector according to a relative position of the first best matching block, and acquiring the second motion vector according to a relative position of the second best matching block;

determining a best motion vector by comparing the first adaptive sums and the second adaptive sums to determine the sum with the smallest value, wherein the best motion vector is the first or second motion vector corresponding to the sum with the smallest value; and performing a motion compensation to the current frame, the previous frame, and the best motion vector for acquiring a interpolated frame.

10. The method according to claim 9, wherein before the step of performing a motion compensation to the current frame, the previous frame, and the motion vector, the method further comprises:

performing a motion vector smoothing process to the best motion vector.

11. The method according to claim 9, wherein the step of performing the sub-sampled motion estimation further comprises:

acquiring the matching block every other pixel.

12. The method according to claim 9, wherein the step of performing the extended bilateral motion estimation further comprises:

separating a searching block of the interpolated frame into a plurality of blocks;

generating a plurality of reference blocks between adjacent ones of the blocks; and using the blocks and the reference blocks as bases to acquire at least one group of matching blocks from the current frame and the previous frame symmetrically.

13. The method according to claim 9, wherein the first sums and the second sums are generated by the following formula:

$$ASBAD = \sum_{i=0}^{N-1} \sum_{j=0}^{M-1} (|f_n(x-h+i, y-k+j) - f_{n-1}(x+h+i, y+k+j)| + a(h, k)),$$

wherein ASBAD is the adaptive sum of bilateral absolute difference, $f_{n-1}$ is a block pixel value of the previous frame, $f_n$ is a block pixel value of the current frame, x and y are the coordinate of the block, i and j are the pixel addresses in the block, h and k are the addresses in the searching matching block, and a(h, k) is the adaptive parameter.

* * * * *